(12) United States Patent
Wu et al.

(10) Patent No.: US 7,979,459 B2
(45) Date of Patent: Jul. 12, 2011

(54) SCALABLE MODEL-BASED PRODUCT MATCHING

(75) Inventors: Kai Wu, Beijing (CN); Daniel Takacs, Redmond, WA (US); Tong Yao, Beijing (CN); Jiyu Zhang, Beijing (CN); Hua Yang, Beijing (CN); Ji-Rong Wen, Beijing (CN); Jonathan R M Hart, Kirkland, WA (US); Eric Anthony Reel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 11/763,539

(22) Filed: Jun. 15, 2007

(65) Prior Publication Data

US 2008/0313165 A1  Dec. 18, 2008

(51) Int. Cl.
*G06F 17/30* (2006.01)
*G06Q 10/00* (2006.01)

(52) U.S. Cl. ........ 707/769; 707/944; 707/748; 707/736; 707/791; 707/803; 707/749; 707/750; 705/1.1; 705/300

(58) Field of Classification Search .................. 707/736, 707/748–750, 769, 791, 803, 944; 705/1.1, 705/300
See application file for complete search history.

(56) References Cited

U.S. PATENT DOCUMENTS

| | | | | |
|---|---|---|---|---|
| 5,855,015 | A  * | 12/1998 | Shoham | 707/5 |
| 6,408,294 | B1 * | 6/2002 | Getchius et al. | 707/5 |
| 6,484,165 | B1 | 11/2002 | Beall et al. | |
| 6,785,671 | B1 * | 8/2004 | Bailey et al. | 707/3 |
| 6,799,174 | B2 | 9/2004 | Chipman et al. | |
| 6,907,424 | B1 | 6/2005 | Neal et al. | |
| 7,363,214 | B2 * | 4/2008 | Musgrove et al. | 704/9 |
| 7,885,863 | B2 * | 2/2011 | Ojakaar et al. | 705/26.7 |
| 2002/0091534 | A1 * | 7/2002 | Berning et al. | 705/1 |
| 2003/0018659 | A1 * | 1/2003 | Fuks et al. | 707/500 |
| 2003/0110063 | A1 | 6/2003 | Among et al. | |
| 2003/0144924 | A1 | 7/2003 | McGee | |
| 2004/0068339 | A1 | 4/2004 | Cheetham et al. | |
| 2004/0260694 | A1 | 12/2004 | Chaudhuri et al. | |
| 2005/0034071 | A1 * | 2/2005 | Musgrove et al. | 715/530 |
| 2005/0197893 | A1 * | 9/2005 | Landau et al. | 705/14 |
| 2006/0129446 | A1 * | 6/2006 | Ruhl et al. | 705/10 |
| 2007/0027856 | A1 * | 2/2007 | Lee | 707/3 |
| 2007/0073591 | A1 | 3/2007 | Perry et al. | |

(Continued)

FOREIGN PATENT DOCUMENTS

| | | |
|---|---|---|
| WO | WO9802835 A1 | 1/1998 |
| WO | WO0155886 A1 | 8/2001 |

OTHER PUBLICATIONS

Matthes et al., "PIA—A Generic Model and System for Interactive Product and Service Catalogs", Lecture Notes in Computer Science, vol. 1696, 1999, pp. 20.

(Continued)

*Primary Examiner* — Frantz Coby (57) ABSTRACT

Aspects of the subject matter described herein relate to matching product information to products. In aspects, a product matching component receives product information. The product matching component normalizes the product information and obtains keywords from the product information. By querying a database of recognized products, the keywords are used to obtain a list of products that potentially match the product information. A confidence level is assigned to each of the potential matches in the list. A match may be returned for the highest matched product or for a selectable number of products whose confidence level(s) exceed a selectable threshold.

21 Claims, 7 Drawing Sheets

U.S. PATENT DOCUMENTS

2007/0083506 A1* 4/2007 Liddell et al. .................. 707/5
2007/0118506 A1* 5/2007 Kao et al. ...................... 707/3
2007/0143122 A1* 6/2007 Holloway et al. ............. 705/1
2008/0091547 A1* 4/2008 Baker ............................ 705/26
2008/0215571 A1* 9/2008 Huang et al. .................. 707/5
2008/0244431 A1* 10/2008 Chea et al. ................... 715/764
2008/0249764 A1* 10/2008 Huang et al. .................. 704/9

OTHER PUBLICATIONS

Wang et al., "A Fuzzy Logic Based Intelligent Negotiation Agent (Fina) In Ecommerce", May 2006, pp. 4.

Hansenne et al, "Design and Implementation of a Scalable Fuzzy Case-Based Matching Engine", ICEIS, 2004, pp. 375-382.

* cited by examiner

SCALABLE MODEL-BASED PRODUCT MATCHING

BACKGROUND

Searching for and researching products accounts for over 20% of all web search queries. Some online retailers may provide a mechanism for people to review products so that other customers can research a product before they buy it. Other online retailers may have a good price but may not provide the review mechanism. Millions of coupons for various products may be continually introduced and expire as companies run promotions. For a consumer, finding the best product at the best price can be a time-consuming task.

SUMMARY

Briefly, aspects of the subject matter described herein relate to matching product information to products. In aspects, a product matching component receives product information. The product matching component normalizes the product information and obtains keywords from the product information. By querying a database of recognized products, the keywords are used to obtain a list of products that potentially match the product information. A confidence level is assigned to each of the potential matches in the list. A match may be returned for the highest matched product or for a selectable number of products whose confidence level(s) exceed a selectable threshold.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
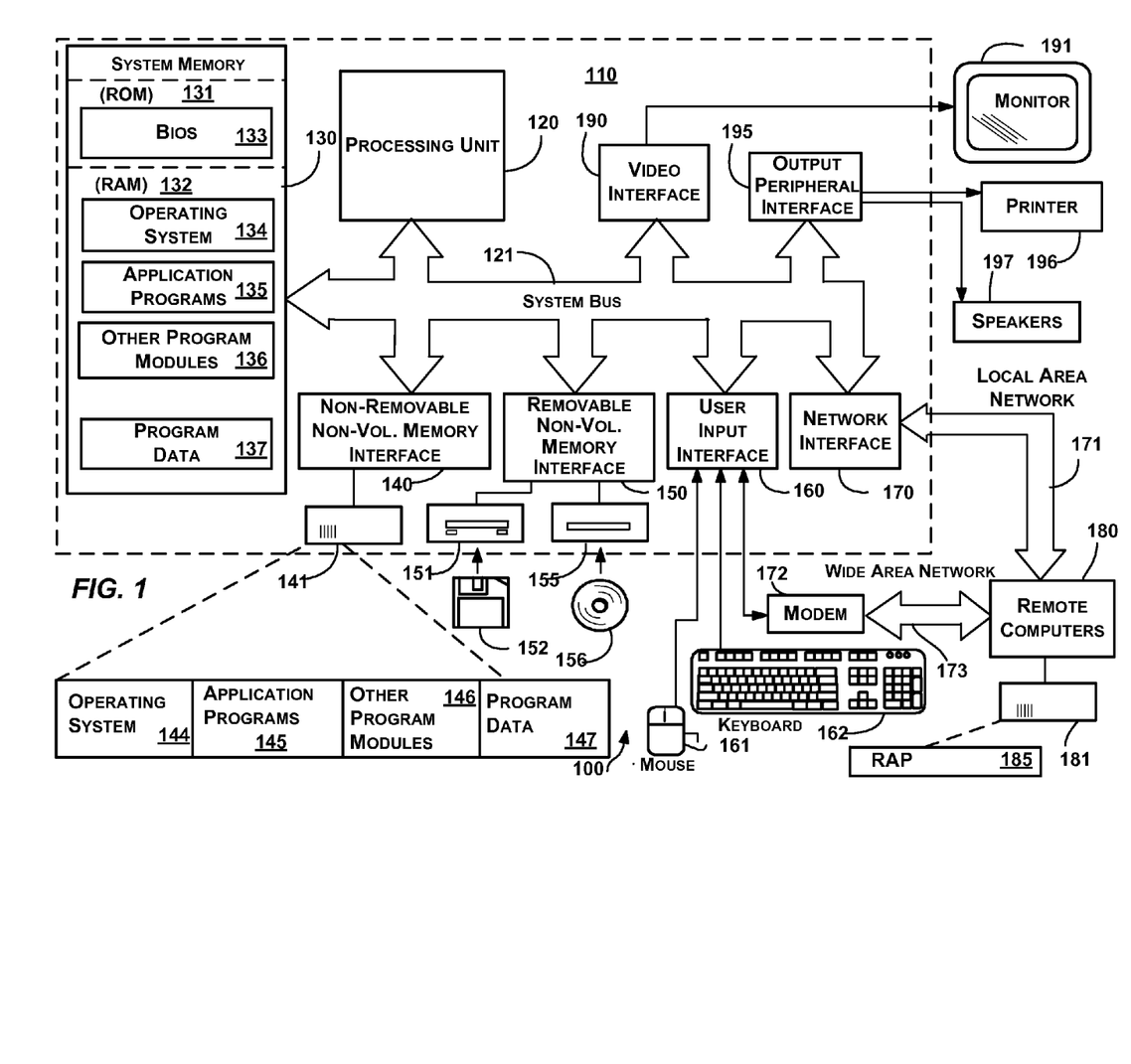
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Product Matching

Figure 2:
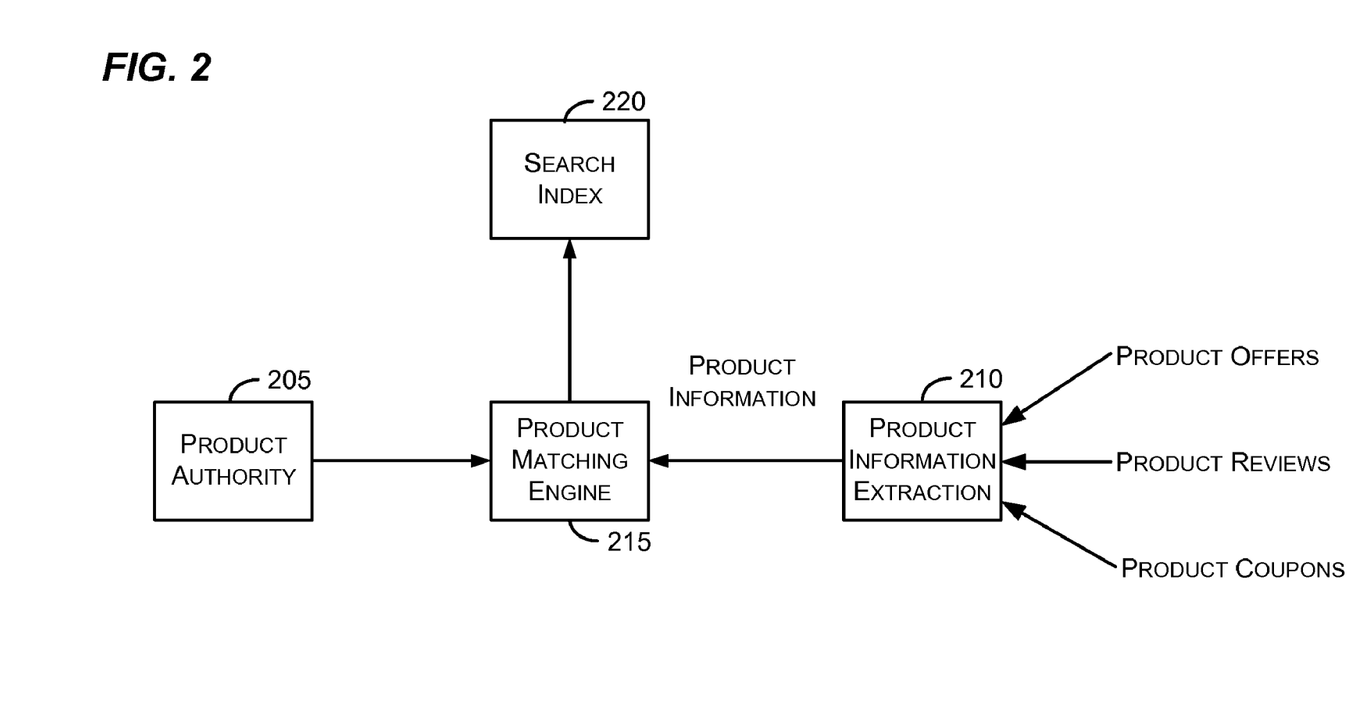
FIG. 2 is a block diagram representing an exemplary environment in which aspects of the subject matter described herein may be implemented.

As mentioned previously, finding a product online can be a time-consuming task. This may be complicated by the fact that different Web sites may identify the same product by different model numbers, names, descriptions, and so forth. FIG. 2 is a block diagram representing an exemplary environment in which aspects of the subject matter described herein may be implemented. FIG. 2 includes a product authority 205, a product information extraction component 210, a product matching engine 215, and a search index 220.

The product authority 205 may include an authoritative list of products. This product authority 205 may be thought of as an electronic catalog of products. For each product, the product authority 205 may include fields such as name, description, brand, model number, a global trade item number (GTIN) or other identifier (ISBN, UPC, EAN, GS1, and so forth), category, price, image, other information about a product, and so forth. In some embodiments, the product authority 205 may include a list of products that are unique. The product authority 205 may be updated and maintained and duplicate products removed either manually, semi-automatically, or fully automatically without departing from the spirit or scope of aspects of the subject matter described herein.

In one embodiment, the product authority 205 may include entities that are canonical representations of product clusters. In many cases, these entities may represent unique product stock keeping units (SKUs). In another embodiment, entities in the product authority 205 may also represent superclasses or subclasses of other entities managed by the system. Examples of this include, but are not limited to, entities that describe all products within a given product line or entities that represent a set of minor variations (color, size, etc.) of a given product.

In another embodiment, the product authority 205 may include many different categories. These categories may be arranged hierarchically. Some exemplary top-level categories include books, music, movies, toys, video games, consumer electronics, tools, automotive, food, home and garden, clothing, jewelry, health and beauty, kids and baby, sports and fitness, and other categories. It is to be recognized, however, that more, fewer, or different categories may be found in the product authority 205 without departing from the spirit or scope of aspects of the subject matter described herein.

Each product may be associated with a system unique identifier that is used to uniquely identify the product in the product authority 205. This system unique identifier may be different from the GTIN or other identifier indicated above. A system unique identifier may be used as a key with which to reference a product in the product authority 205.

The product information extraction component 210 may extract product information from information obtained from Web sites. For example, product information may be obtained from product offers, product reviews, product coupons, and other sources of product information. The product information extraction component 210 may fill in as many of the product fields mentioned previously as it can for each product source of information. The product information extraction component 210 may also indicate an address (e.g., a URL) at which the information was found.

In many cases, the product information provided to the product matching engine 215 may be incomplete. That is, few or not all of the fields may be filled in. For example, product information extracted from a product review may not include a price of the product. In these cases, the product matching engine 215 may apply fuzzy logic, rules, heuristic, statistics, and/or other logic to use the fields that have been filled in to match a product in the product authority 205.

Note that the product information extraction component 210 may be manual (e.g., performed strictly by people), semi-automatic, or fully-automatic without departing from the spirit or scope of aspects of the subject matter described herein. Furthermore, the methodology by which information is extracted from product information sources is not intended to be a limitation on aspects of the subject matter described herein as any type of extraction method may be used without departing from the spirit or scope of aspects of the subject matter described herein. In one embodiment, as far as the product matching engine 215 is concerned, how the product information is obtained is irrelevant. Indeed, in some embodiments, the product information may come from places other than Web sites. For example, the product information may be obtained from a natural language query provided by a user.

The product matching engine 215 receives product information from the product information extraction component 210 and attempts to match the product information with a product within the product authority 205 as described in more detail below. If a match is found, the product matching engine 215 provides a tuple or other data structure that associates a product from the product authority 205 with the product information. This data structure may include a unique identifier of the product found in the product authority 205 together with a URL that indicates where the product was found, for example. The data structure may also include an identifier of the type of information that was found (e.g., product offer, review, coupon, and so forth) as well a portion or the complete text of the information. For example, the data structure may indicate that a particular Web site is selling a product at a particular price. As another example, a data structure may indicate a Web site and may include test of a review found on the Web site.

In one embodiment, more than one match may be returned. If the confidence level of a matched product exceeds a selectable threshold, a unique identifier for the product, along with confidence data on the strength of the match may be returned. The maximum number of matches to return may be configured and re-configured as desired.

In one embodiment, the data structure may be provided to a search index component 220 which may place the data structure (or data derived therefrom) in a database so that a query for the product may be able to quickly find product information related to the product. In another embodiment, the data structure may be used by the search index component 220 or another component to provide links to the Web sites from which the product information was obtained.

In one embodiment, it may be irrelevant from the product matching engine 215's perspective where its output is directed. Thus, in one embodiment, the search index 220 may be replaced by one or more other components to receive the output of the product matching engine 215.

FIGS. 3-6 are flow diagrams that generally represent exemplary actions that may occur in accordance with aspects of the subject matter described herein. For simplicity of explanation, the methods described in conjunction with FIGS. 3-6 are depicted and described as a series of acts. It is to be understood and appreciated that the aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methods in accordance with aspects of the subject matter described herein. In addition, those skilled in the art will understand and appreciate that the methods could alternatively be represented as a series of interrelated states via a state diagram or as events.

Figure 3:
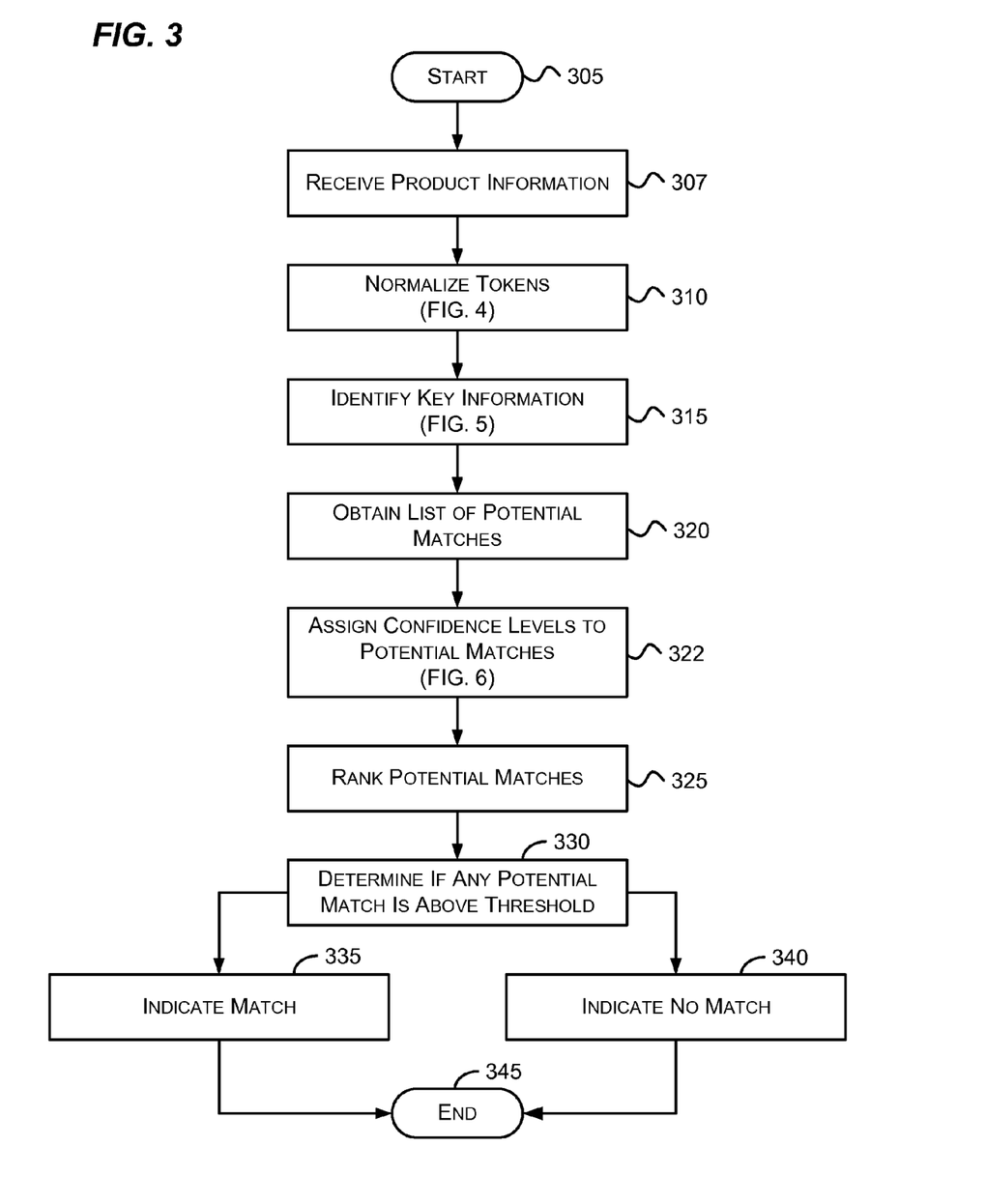
FIG. 3 is a flow diagram that generally represents exemplary actions that may occur to match product information to a product in a product authority in accordance with aspects of the subject matter described herein.

FIG. 3 is a flow diagram that generally represents exemplary actions that may occur to match product information to a product in a product authority in accordance with aspects of the subject matter described herein. The actions begin at block 305.

At block 307, product information is received. For example, referring to FIG. 2, the product information extraction component 210 may send product information to the product matching engine 215.

Figure 4:
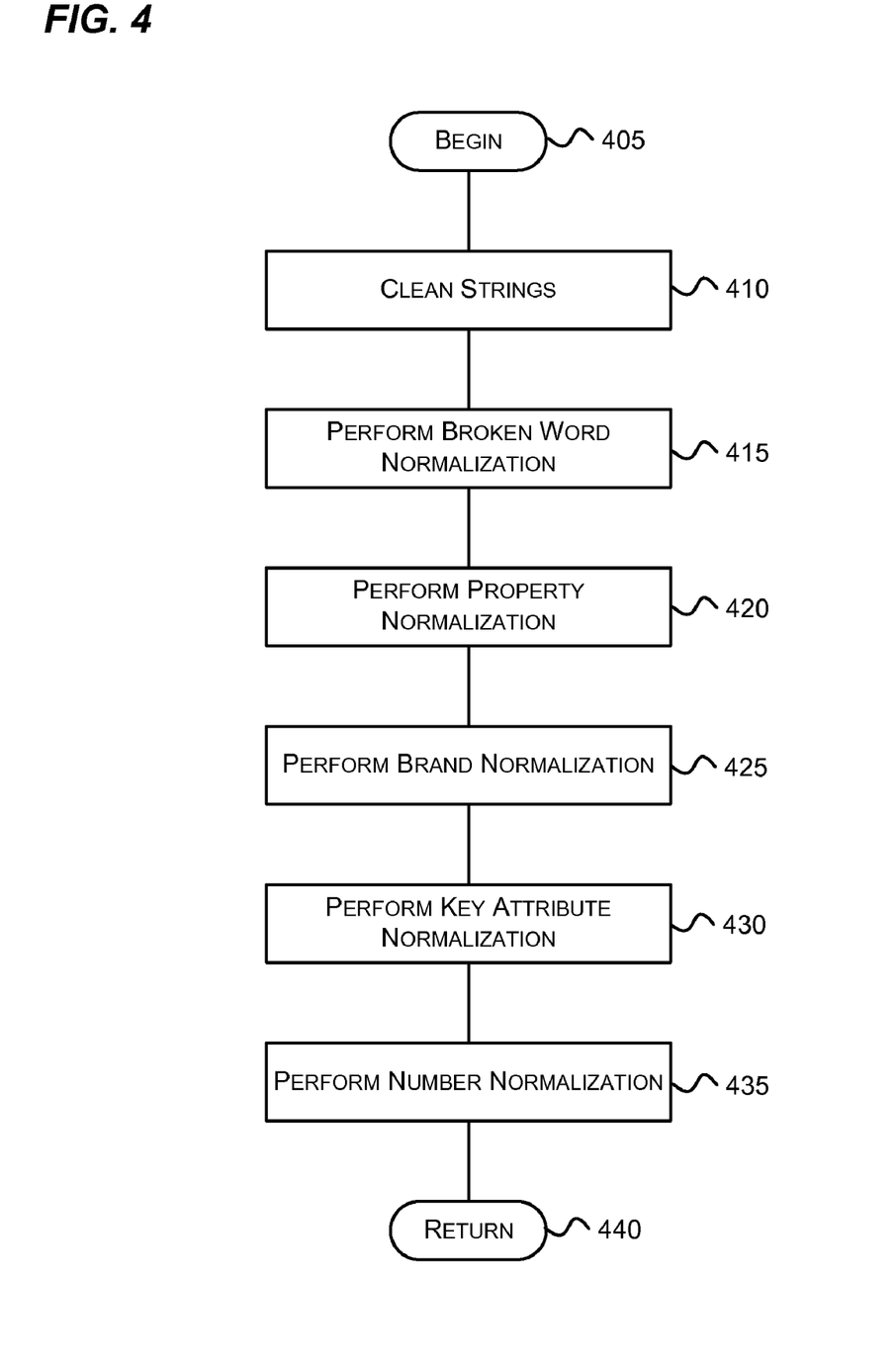
FIG. 4 is a flow diagram that generally represents actions corresponding to block 310 of FIG. 3 that may occur to normalize tokens in accordance with aspects of the subject matter described herein.

At block 310, the tokens in the received product information are normalized as described in more detail in conjunction with FIG. 4. A token may include one or more pieces of text and may include numbers, alphanumeric characters, and special characters. Briefly, token normalization turns important tokens that are the same in meaning but different in representation to a standard format. For example, a product with product information of "Sony cybershot dsc-p72 camera" and a product with product information of "Sony cyber shot dscp72" may indicate the same product even though the product information is not exactly the same.

Figure 5:
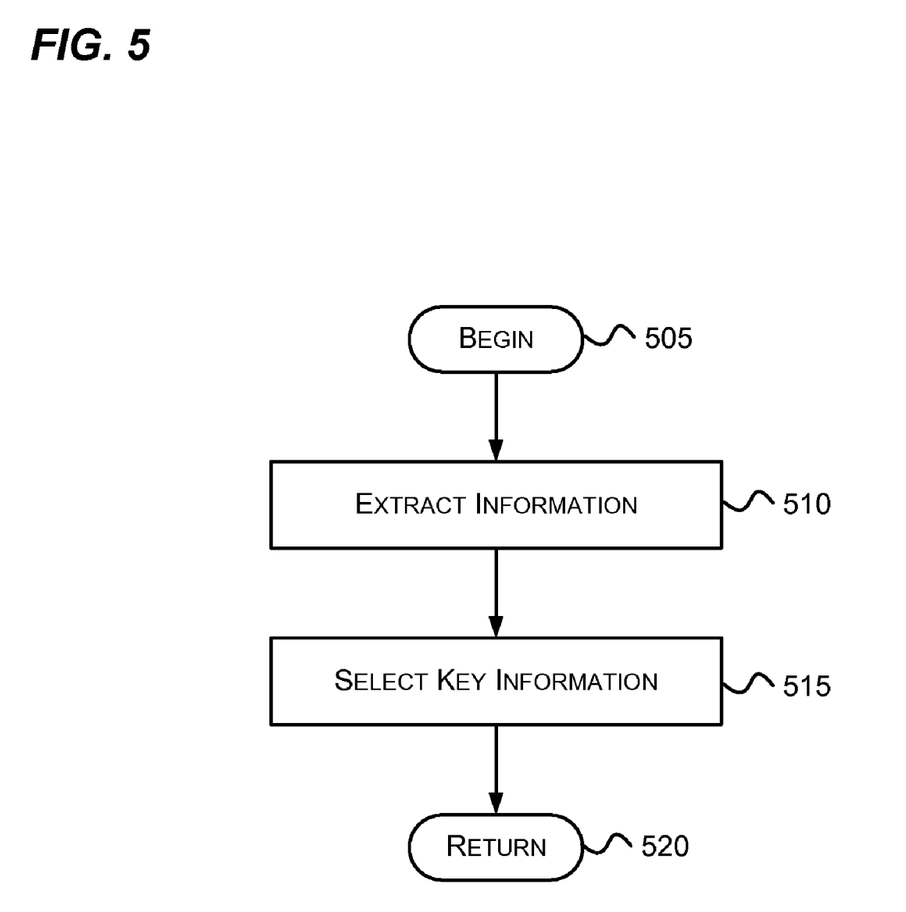
FIG. 5 is a flow diagram that generally represents actions corresponding to block 315 of FIG. 3 that may occur to identify and select key information in accordance with aspects of the subject matter described herein.

At block 315, key information within the product information is identified and selected as described in more detail in conjunction with FIG. 5. Briefly, at a Web site, product information may be incomplete (e.g., not include all the fields that a product authority would have for the product) or may include information in an unstructured field (e.g., includes a UPC, model number, and so forth in a text field). This information may be identified and selected as described in more detail in conjunction with FIG. 5.

At block 320, a list of potential matches is obtained from the product authority. This list may be obtained by using the key information identified in block 315. For example, referring to FIG. 2, the product matching engine 215 may query the product authority 205 using a list of key terms. In response, the product authority 205 may return a result set of one or more products that satisfy the query. To satisfy the query, a product in the product authority 205 includes the key terms sent by the product matching engine 215.

Figure 6:
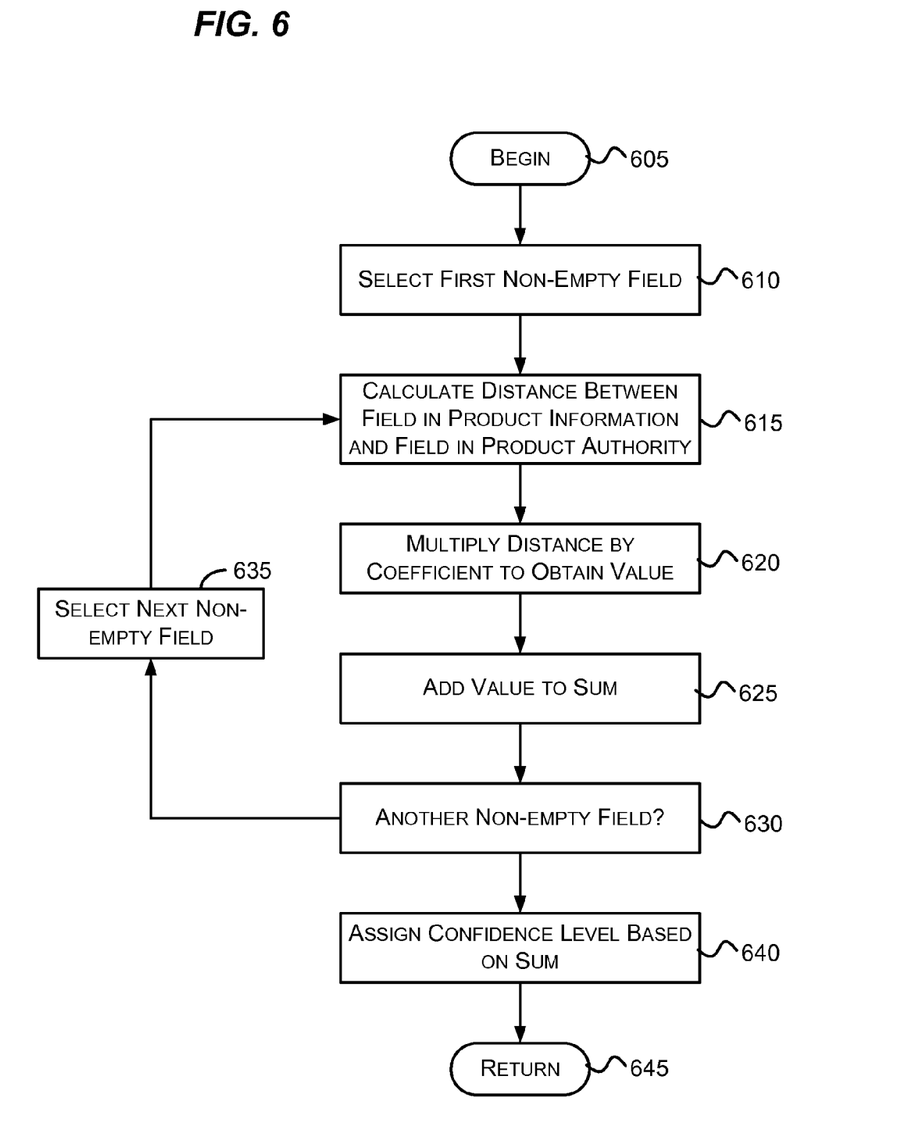
FIG. 6 is a flow diagram that generally represents exemplary actions for assigning confidence levels to potential matches in accordance with aspects of the subject matter described herein.

At block 322 confidence levels are assigned to potential matches as described in more detail in conjunction with FIG. 6. Briefly, confidence levels may be assigned based on how close the product information is to information included in the potential matches. In one embodiment, the confidence levels may be assigned based on all the product information instead of just the key terms.

At block 325, the list of potential matches is ranked. This may be done by sorting the potential matches based on the confidence levels. In one embodiment, the actions associated with this block may be omitted as the potential match with the highest confidence level may be used without sorting the list of potential matches.

At block 330, a determination is made as to whether any of the potential matches is good enough to be deemed a match to the product information. If a match is determined to be good enough, the actions continue at block 335; otherwise, the actions continue at block 340.

The level of confidence that needs to be reached before a match is declared may be configurable and tuned on each model. In some embodiments, the level of confidence may be expressed as a threshold. If enough product information matches fields in a product to exceed the threshold, a match is declared; if not, a match is not declared. Note that contradictory information may be used to reduce the confidence in a match to a particular product.

At block 335, a match is indicated. This may be done by outputting a system unique identifier of the product from the product authority and/or information from the product information. In one embodiment, at block 335, if more than one of the products exceeds the threshold, a list of system unique identifiers is outputted along with confidence data on the strength of each such product. The maximum number of matches returned in the list may be determined by a configurable setting.

At block 340, an indication of no match is given.

At block 345, the actions end.

FIG. 4 is a flow diagram that generally represents actions corresponding to block 310 of FIG. 3 that may occur to normalize tokens in accordance with aspects of the subject matter described herein. At block 405, the actions begin.

At block 410, strings within the product information are cleaned. For example, in string cleanup, characters such as '-', '.', extra space, extra zeroes, and other characters may be removed from product information. Alphabet characters may be lower-cased and extensible language markup (XML) escape characters may be transformed to their original characters. In addition, a stemming algorithm may be used to reduce words to their root form. For example, words like "fishing," "fished," and "fisher," may be reduced to the root word fish. The purpose of cleaning the strings is to obtain a string that is most likely to be what will be found in the product authority.

At block 415, broken word normalization is performed. Broken words normalization turn phrases like "A B" and "AB" into a standard phrase. For example, the phrase "power shot" may be turned into "powershot." To determine which phrases need to be replaced with other phrases, a list may be used that identifies the phrases. The list may associate each phrase that needs to be replaced with a replacement phrase.

For example, the list may include phrases such as:
1. "Sony cybershot dsc-p72 camera"=>"Sony cybershot dscp72 camera"
2. "Sony cyber shot dscp72"=>"Sony cybershot dscp72"

where the symbol "=>" means replace the phrase that is on the left with the phrase that is found on the right when it is found in product information. The list above is merely exemplary and there may be many more, fewer, and/or different phrases in the list.

Furthermore, the list may be tuned by model. Terms in different categories may have different meanings and different significance. Different matching models may be used for different categories. Similar categories may be grouped into a single model. For example, a C&E model may include Computing, Electronic, Camera, Musical Instruments, and the like. Each model may be tuned separately to assist in providing the highest accuracy without affecting other categories.

In one embodiment, a model is a collection of data, regular expressions, and/or rules, and the like that are pre-built in preparation for matching product information to products. For example, a model may include a list of phrases that are to be replaced with other phrases. A model may indicate that certain letters are to be removed in the cleanup phase. A model may include a table of inverted word frequencies for use in selecting keywords. A model may be changed dynamically without changing the code of the product matching engine.

A model may be specific to one or more categories of products and may be pre-built to work with those one or more categories. Thus, a list of replacement phrases that applies to products associated with one model may not apply to products associated with another model.

At block 420, property normalization may be performed. In property normalization, a property term model may be used to identify the property names and their equivalencies. For example, an MP3 player may be identified by that amount of memory it includes. For example, an ipod nano having one gigabyte of memory may be identified as "ipod nano 1 gb mp3 player" or "ipod nano 1024 mb mp3 player." Both of these descriptions describe the same device, but use different notations for the property of how much memory the device has. In this case, a list may indicate to replace the 1 gb property with 1024 mb, to replace the 1024 mb property with 1 gb, or some other replacement.

As another example, a digital camera may be represented by the number of pixels the camera is capable of obtaining in one picture. For example, the same Kodak camera may be identified as "Easyshare C530 5.0 mpix" or "Easyshare C530 5 mp camera." Both of these phrases indicate a camera that has a 5 megapixel picture capacity. In this case, a list may indicate to replace the "5.0 mpix" property and the "5 mp" property with a 5 mp property.

Again, the examples above are not intended to be all-inclusive of the properties that may be normalized. Indeed a property normalization list may include many other properties to normalize. Furthermore, each model may have a customized list that may be changed from time to time.

At block 425, brand normalization may be performed. For example, product information may include various brand names. For example, Sony may be known by Sony Corp., Sony Corporation, Sony, Incorporated, Sony, Inc., Sony, Ltd., and so forth. These names may appear in product information. To avoid ambiguity in matching, the brand name may be normalized by a list that associates brand names with replacement brand names. For example, the list may include an entry for each variation of the company together with an associated replacement name for the company.

At block 430, key attribute normalization may be performed. There are many established ways of identifying a product including GTIN, ISBN, EAN, UPC, ITF, ISSN, and so forth. Organizations have defined ways for converting one type of identifier into another type of identifier. Key attribute normalization may be used to convert from one form to a standardized form.

To do this, a pattern model (e.g., a regular expression) may be used to identify an identifier within product information. If text within product information meets the criteria of the regular expression, the text may be identified as a particular type of identifier. The text may then be converted into a standard identifier via rules established for converting from one form to another. For example, a UPC identifier such as "0-127891-6" may be converted to "0012100007896".

At block 435, number normalization may be performed. As an example, a Sony camera may be identified as "Sony A100 10 0.2 mp" or "Sony A100 10.2 mp camera." Number normalization may turn the numbers "10 0.2" into 10.2, for example. Again, a pattern-based model may be used to perform number normalization.

Each of the normalizations and cleanup mentioned above may be tuned by examining results of the normalization for the same product that has different product information and creating functions that transform strings and phrases that should yield the same product. As mentioned previously, this may be done on a model-by-model basis where normalization functions that apply to one model do not apply to another model.

At block 440, the actions return having normalized the product information.

FIG. 5 is a flow diagram that generally represents actions corresponding to block 315 of FIG. 3 that may occur to identify and select key information in accordance with aspects of the subject matter described herein. At block 505, the actions begin.

At block 510, information within the product information is identified and extracted. For example, key information such as a UPC, model number, and so forth may be embedded in a block of unstructured text. A pattern-based model (e.g., regular expressions or rules-based logic) may be used to extract that information from a description, product specification, or some other structured or unstructured text.

At block 515, key information is selected from the extracted information. In matching, not all terms/properties may be equal. In particular, certain key terms identify a product better than other terms. For example, the word "the" may be meaningless in determining a match to product information. The word "camera" may be meaningless when attempting to match to digital camera products. At least two types of inverse document frequency (IDF) models may be used to help remove insignificant words and identify key terms as described in more detail below.

Note that the key terms identified and/or selected may fall into various types. Some key terms (sometimes referred to as "hard key attributes"), such as UPC, ISBN, GTIN, and so forth may be used to match a product in the product authority with a high level of confidence. Unfortunately, these key terms are often not found on Web sites.

Other key terms (sometimes referred to as "soft key attributes") such as category, brand, model number, capacity, and so forth may also be used to match a product in the product authority with good confidence, but perhaps not as high of confidence as the hard key attributes above.

A combination of soft key attributes may be treated like a hard key attribute. For example, some terms in combination may be very indicative of a particular product. For example, if a brand and model number are found in product information, this combination may be very indicative of a match to a particular product and may be treated as a hard key attribute.

Terms that are neither hard nor soft key attributes may not be as good as the terms mentioned above. To match on these terms, other matching may be used on the key terms selected.

One example of key term selection is if an offer gives product information of "Canon PowerShot A540 Digital Camera—6.0 Megapixels—16:9 Widescreen . . . ," the key terms selected may be "Canon PowerShot A540."

Another example of key term selection is if an offer gives product information of "apple ipod nano 2 gb mp3 player," the key terms selected using a unigram may be "apple ipod nano." Unfortunately, there may be many products that are identified by these key terms as this product may come in various memory sizes.

Using a bigram, the key terms selected may include "ipod nano 2 gb." The term "apple" may be dropped because its meaning is already expressed by the word "ipod."

An IDF model contains a list of terms and their relative significance in identifying corresponding products. For example, in the product information "Canon PowerShot A540 Digital Camera—6.0 Megapixels—16:9 Widescreen," only Canon, Powershot, A540 may be significant to identify the product. Attempting to match the complete product information may not find a good match because some of the information is not so significant and may be misleading.

The IDF value for a word/phrase w may be calculated using the formula below:

IDF(w)=$\log_{10}$(N/N$_{(w)}$), where N is the number of all the names and N(w) is the number of the names that w occurs in IDF(w) is the inverse document frequency of a word according to a set of documents. IDF(w) may be calculated as indicated above by using the set of documents and the formula above.

P(w1, w2 . . . , wn) is the probability that w1, w2 . . . , wn occurs in a same item name within a collection of items. P(w) may be calculated by the following formula:

$$p_{(w)} = 10^{-IDF(w)}$$

P(w1, w2 . . . , wn) may be approximated by the following formula:

$$p_{(w1, w2 \ldots, wn)} \approx 10^{-\sum_{i=1}^{n} IDF(wi)}$$

Finally, the IDF for each w may be approximated by the following formula:

$$\sum_{i=1}^{n} IDF_{(wi)} \approx -\log_{10}(p_{(w1,w2...,wn)})$$

Bigrams may be used to find the pairs in which the two words are similar in meaning and remove the one that is less important. Less important in this sense means the one that is less indicative or less useful in matching to a product in the product authority.

Similarity may be computed by the following formula:

$$Similarity_{(w1,w2)} = (IDF_{(w1)} + IDF_{(w2)} - IDF_{(w1,w2)})$$

Similarly, n-grams including more than two words may also be used to eliminate one or more words that are less important in matching a product to a product in the product authority.

Note that the IDFs for various models may (and most often will) be computed in advance of the keyword extraction and selection. Results from the IDFs may be stored in a table that may be consulted by the product matching engine in extracting and selecting keywords.

Key terms may be selected until the sum of the importance of the keywords exceeds a threshold. For example in the product information "Canon PowerShot A540 Digital Camera—6.0 Megapixels—16:9 Widescreen . . . ," the words of the phrase may be ordered by their relevance in matching to a product. Each of the words may also be assigned a value according to their relevance in finding a match. To select the keywords to use, the value associated with each word may be added to a running total. Once the running total exceeds a threshold, the keyword selection may be complete.

For example, the keywords above may be assigned values according to the table below:

| Word | Value |
|---|---|
| Canon | 50 |
| PowerShot | 70 |
| A540 | 100 |
| Digital | 20 |
| Camera | 1 |
| 6.0 Megapixels | 25 |
| 16:9 Widescreen | 30 |

Ordered in terms of most relevant to least relevant, this table may be ordered as follows:

| Word | Value |
|---|---|
| A540 | 100 |
| PowerShot | 70 |
| Canon | 50 |
| 16:9 Widescreen | 30 |
| 6.0 Megapixels | 25 |
| Digital | 20 |
| Camera | 1 |

If the threshold is 200, keywords may be selected until the cumulative total of values of the keywords exceeds the threshold. For example, to exceed this threshold, the terms A540, PowerShot, and Canon may be selected.

FIG. 6 is a flow diagram that generally represents exemplary actions for assigning confidence levels to potential matches in accordance with aspects of the subject matter described herein. At block 605, the actions begin.

At block 610, the first non-empty field of the product information is selected. For example, if a product has a product name, this field may be selected.

At block 615, a distance between the field of the product information and a corresponding field in the product authority may be calculated. The distance may be calculated differently for different types of fields. For example, for name and description, the distance may be calculated by adding a significance value for each word included in the product information field that is also in the product in the product authority field and subtracting a significance value for each word in the product information field that is not in the product authority field. In one embodiment, a word's significance may be calculated by the following function:

$$F(w) = \text{Log}((\text{NumberOfPossibleWords})/\text{NumberOfOccurencesOfWord}(w))$$

Note that this formula creates a greater value for words that occur less frequently.

For very indicative terms (e.g., model number, GTIN number), the significance value may be computed by If $w1=w2$ then $F(w)=1$ else $F(w)=-1$.

For fields such as price, the significance value may be calculated based on how close (e.g., in standard deviations) the price is from the average price for the product.

Several significance values may be calculated using different algorithms even for the same field type. In this case, a weighted average for these values may be calculated and used as the final significance value for this field type.

At block 620, the distance may be multiplied to a coefficient to obtain a value. This coefficient may be model specific and may be determined by training a system (e.g., a neural network). The coefficient may be relatively large for fields (e.g., model number, GTIN, etc.) that are very indicative of a product and relatively small for fields that are not as indicative of the product.

At block 625, the value is added to a sum. If the value is positive, the sum increases; if the value is negative, the sum decreases. The sum roughly corresponds to a confidence level that is to be assigned to the product information. The confidence level indicates a confidence that this product information matches the particular product.

At block 630, a determination is made as to whether there is another non-empty field. If so, the actions continue at block 635; otherwise, the actions continue at block 640.

At block 635, the next non-empty field is selected after which the actions associated with blocks 615-630 are repeated.

At block 640, a confidence level is assigned to the product information based on the sum obtained. In one embodiment, the confidence level may be equivalent to the sum. In another embodiment, the confidence level may be some function of the sum.

At block 645, the actions return.

Although the actions described above with respect to FIG. 6 represent one exemplary methodology by which a confidence level may be assigned, in other embodiments, other methodologies may be used. For example, fuzzy logic may be applied to the product information to make this determination.

Fuzzy logic is a mathematical method of handling imprecise concepts. For example, "coldness" is not something that may be expressed by an equation. People may have a sense of what "cold" is, but there may be no sharp cutoff between "cold," "warm," and "hot."

Fuzzy logic may attempt to match product information to a product based on rules associated with each of the pieces of information contained in the product information. Fuzzy logic may use if/then rules or their equivalents (such as an associative matrix).

The product information may have missing or contradictory fields. For example, the product information may be missing the price or a model number but may include enough other information to be fairly confident to match the product information with a product in the product authority. As another example, a product may include a model number that matches a product the product authority but include a price that is far away from the average price of the product.

Product information may include many fields that match fields in a product in the product authority but the product matching engine may still determine that there is not a match. For example, product information may include "Camera case for a Canon PowerShot A540 digital camera." While the key words "Canon, PowerShot, and A540" may be strongly indicative of a particular camera within the product authority, the term "case" may strongly indicate that a match not be made to the camera. Furthermore, if a price included with the product information is not within an acceptable deviation from a median price of the camera product, this may also be used by the fuzzy logic to not match the product information with the camera.

Aspects of the subject matter described herein may also be directed towards scalability. For example, there may be in excess of 50 million products in a product authority database, 100 million product offers, 10 million reviews, and millions of coupons. Product information may be constantly being collected by a web crawler to obtain updated product information. To scale to these types of numbers, more than one product matching engine may be needed.

In one embodiment, there may be multiple product matching engines. As indicated previously, a model may include several similar product categories. To scale, each matching engine may be assigned to match product information for one or more models. A model may be split (e.g., randomly or otherwise) into several sub-models if it is too large to be loaded on a single machine.

For example, models may be mapped to machines via a table such as the following:

| Model Id | Machine Id |
|----------|------------|
| 1        | 1          |
| 1        | 2          |
| 2        | 3          |
| 2        | 4          |
| 3        | 2          |

Models may be replicated on each machine. A matching engine may activate one or more models based on its configuration, load, and/or other circumstances. As shown in the above table, each machine may support multiple models depending on its capability. For example, referring to the table above, a machine 2 supports both model 1 and model 3.

In addition, a model may be active on multiple machines. For example, model 1 may be active on both machine 1 and machine 2. This capability may be used to load-balance work to multiple machines.

Since models may reside on multiple machines, if one machine fails, other machines may take over its responsibility. This may be done by re-arranging the active models hosted on those machines. While this may reduce performance, it should give enough time to administrators to fix problems.

A scale-unit design may also be used to add to scalability. In a scale-unit design, each scale unit includes a set of machines that covers a set of models. Load balancing may be done within the machines within a scale unit and/or across scale-units so that if a scale-unit becomes inoperable or unreachable, matching requests may be directed to other scale-units.

Figure 7:
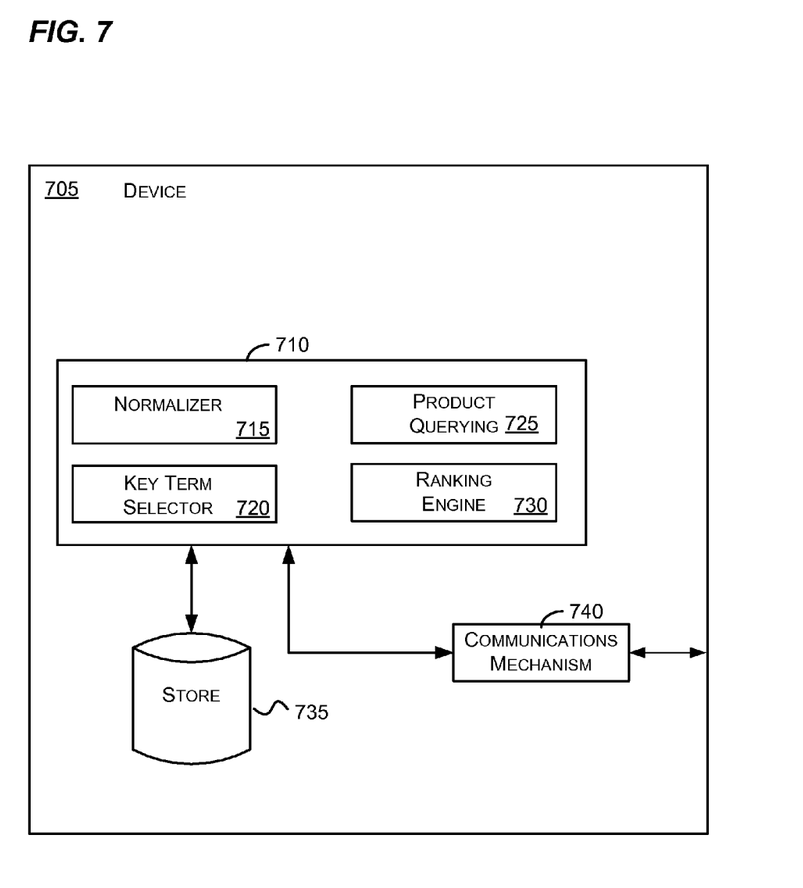
FIG. 7 is a block diagram that represents an exemplary device configured to operate in accordance with aspects of the subject matter described herein.

FIG. 7 is a block diagram that represents an exemplary device configured to operate in accordance with aspects of the subject matter described herein. The device 705 may include matching component 710, a store 735, and a communications mechanism 740. The matching component 710 may include a normalizer 715, a key term selector 720, a product querying engine 725, and a ranking engine 730. One exemplary device that may be used to implement the device 705 is a computer such as the computer 110 of FIG. 1.

The communications mechanism 740 allows the device 705 to communicate with other devices to receive product information, query a product authority, and provide information about matches, for example. The communications mechanism 740 may be a network interface or adapter 170, modem 172, or any other mechanism for establishing communications as described in conjunction with FIG. 1.

The store 735 is any storage media capable of storing a model. The store 735 may comprise a file system, database, volatile memory such as RAM, other storage, some combination of the above, and the like and may be distributed across multiple devices. The store 735 may be external or internal to the device 705.

The normalizer 715 is a component that cleans-up and normalizes data in received product information. The normalizer 715 may perform the actions described in conjunction with FIG. 4, for example.

The key term selector 720 is a component that extracts and selects key terms. For example, the key term selector 720 may perform the actions associated with FIG. 5.

The product querying engine 725 queries a product database to obtain a list of products that may potentially match a given product. To obtain this list, the product querying engine 725 may provide a list of keywords to the database as described previously. A product authority (such as the product authority 205 of FIG. 2) may include the product database.

The ranking engine 730 may rank the received list of candidate products based on confidence levels as indicated previously.

It will be recognized that other variations of the device 705 shown in FIG. 7 may be implemented without departing from the spirit or scope of aspects of the subject matter described herein. Furthermore, components described in conjunction with FIG. 7 may be combined and/or broken into other components separated in other embodiments. In addition, it will be recognized that more, fewer, or other components may exist on the device 705 without departing from the spirit or scope of aspects of the subject matter described herein.

As can be seen from the foregoing detailed description, aspects have been described related to model-based product matching. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions, which when executed by a computing device cause the computing device to perform actions, comprising:
    extracting product information regarding a product from one or more Web sites, the product information including one or more tokens that describe the product;
    normalizing the extracted product information by normalizing the tokens that describe the product;
    identifying, within the extracted product information, key information for matching the extracted product information to unique products in a product authority database by selecting key terms according to relevance in matching until a sum of values of the selected key terms exceeds a threshold;
    querying the product authority database using the selected key terms to obtain from the product authority database a list of potential matches comprising one or more products in the product authority database that potentially match the extracted product information;
    assigning a confidence level to each of the potential matches obtained from the product authority database by filling product fields for the extracted product information and calculating a distance between each non-empty product field in the product fields for the extracted product information and a corresponding product authority field in the product authority database for each of the products in the list of potential matches;
    determining whether any of the products in the list of potential matches obtained from the product authority database match the extracted product information based on the confidence level assigned to each of the potential matches;
    if at least one of the products in the list of potential matches obtained from the product authority database match the extracted product information, indicating that a match was found and providing a data structure including a unique identifier of each matching product in the product authority database for associating each matching product in the product authority database with the extracted product information; and
    if all of the products in the list of potential matches obtained from the product authority database do not match the extracted product information, indicating that no match was found.

2. The computer-readable storage medium of claim 1, wherein identifying key information within the extracted product information is based on a model that indicates a correlation between the key terms and a specific product category.

3. The computer-readable storage medium of claim 2, wherein the model includes normalization functions for the specific product category.

4. The computer-readable storage medium of claim 2, wherein the computer-executable instructions cause the computing device to remove a selected key term that is similar in meaning to another selected key term and that is deemed less relevant in matching the extracted product information to the unique products in the product authority database than the another selected key term.

5. The computer-readable storage medium of claim 4, wherein the selected key term that is deemed less relevant in matching the extracted product information to the unique products in the product authority database is removed based on a model that utilizes bigrams or n-grams to remove less relevant words.

6. The computer-readable storage medium of claim 1, wherein identifying key information within the extracted product information comprises identifying key terms based on a model that includes pre-computed data regarding word frequency.

7. The computer-readable storage medium of claim 6, wherein the model includes pre-computed data regarding an inverse document frequency of the key terms.

8. The computer-readable storage medium of claim 1, wherein the computer-executable instructions cause the computing device to rank the products in the list of potential matches obtained from the product authority database based on confidence levels.

9. The computer-readable storage medium of claim 1, wherein the product fields for the extracted product information include one or more product fields which do not include data.

10. The computer-readable storage medium of claim 9, wherein the computer-executable instructions cause the computing device to:
    for each non-empty product field in the product fields for the extracted product information:
        calculate the distance between the non-empty product field and a corresponding product authority field product in the product authority database for a product listed as a potential match,
        multiply the distance by a coefficient to obtain a value,
        add the value to a running total, and
        calculate the confidence level for the potential match based on the running total.

11. The computer-readable storage medium of claim 1, wherein the data structure includes a uniform resource locator indicating a Web site at which information for the matching product was found and an identifier indicating type of the information for the matching product that was found.

12. The computer-readable storage medium of claim 1, wherein normalizing the tokens that describe the product comprises removing characters indicated by a model.

13. The computer-readable storage medium of claim 1, wherein normalizing the tokens that describe the product comprises replacing a first phrase within the extracted product information with a second phrase.

14. The computer-readable storage medium of claim 1, wherein determining whether any of the products in the list of potential matches obtained from the product authority database match the extracted product information based on the confidence level assigned to each of the potential matches comprises determining whether the confidence level assigned to each of the potential matches is greater than a selectable threshold.

15. The computer-readable storage medium of claim 1, wherein indicating that a match was found comprises identifying a matching product having a highest confidence level.

16. A computer-implemented method comprising:
    extracting, by a computing device having a data store comprising a product authority database of unique products, product information regarding a product from one or more Web sites, the product information including one or more tokens that describe the product;

the computing device normalizing the extracted product information by normalizing the tokens that describe the product;

the computing device identifying, within the extracted product information, key information for matching the extracted product information to the unique products in the product authority database by selecting key terms according to relevance in matching until a sum of values of the selected key terms exceeds a threshold;

the computing device querying the product authority database using the selected key terms to obtain from the product authority database a list of potential matches comprising one or more products in the product authority database that potentially match the extracted product information;

the computing device assigning a confidence level to each of the potential matches obtained from the product authority database by filling product fields for the extracted product information and calculating a distance between each non-empty product field in the product fields for the extracted product information and a corresponding product authority field in the product authority database for each of the products in the list of potential matches;

the computing device determining whether any of the products in the list of potential matches obtained from the product authority database match the extracted product information based on the confidence level assigned to each of the potential matches;

the computing device indicating that a match was found and providing a data structure including a unique identifier of each matching product in the product authority database for associating each matching product in the product authority database with the extracted product information if at least one of the products in the list of potential matches obtained from the product authority database match the extracted product information; and the computing device indicating that no match was found if all of the products in the list of potential matches obtained from the product authority database do not match the extracted product information.

17. An apparatus on a computing environment having a processing unit and memory, the processing unit executing computer-executable modules stored in the memory on the computing environment, comprising:

a data store comprising a product authority database of unique products;

a product information that extraction component configured to extract product information from one or more Web sites and fill product fields for the extracted product information, the product information including one or more tokens that describe the product;

a normalizer configured to normalize the extracted product information by normalizing the tokens that describe the product;

a key term selector configured identify, within the extracted product information, key information for matching the extracted product information to the unique products in the product authority database by selecting key terms according to relevance in matching until a sum of values of the selected key terms exceeds a threshold;

a product querying engine configured to query the product authority database using the selected key terms to obtain from the product authority database a list of potential matches comprising one or more products that potentially match the extracted product information; and a ranking engine configured to:
  assign a confidence level to each of the potential matches obtained from the product authority database based on the product fields for the extracted product information by calculating a distance between each non-empty product field in the product fields for the extracted product information and a corresponding product authority field in the product authority database for each of the products in the list of potential matches;
  determine whether any of the products in the list of potential matches obtained from the product authority database match the extracted product information based on the confidence level assigned to each of the potential matches;
  if at least one of the products in the list of potential matches obtained from the product authority database match the extracted product information, indicate that a match was found and provide a data structure including a unique identifier of each matching product in the product authority database for associating each matching product in the product authority database with the extracted product information; and
  if all of the products in the list of potential matches obtained from the product authority database do not match the extracted product information, indicate that no match was found.

18. The apparatus of claim 17, wherein the normalizer is configured to replace one or more phrases within the extracted product information with one or more other phrases.

19. The apparatus of claim 17, wherein the key term selector is configured to remove a selected key term that is similar in meaning to another selected key term and that is deemed less relevant in matching the extracted product information to the unique products in the product authority database than the another selected key term.

20. The apparatus of claim 17, wherein the normalizer is configured to normalize the extracted product information based on a model that includes normalization functions for specific product categories.

21. The apparatus of claim 17, wherein the ranking engine is configured to:
  for each non-empty product field in the product fields for the extracted product information:
    calculate the distance between the non-empty product field and a corresponding product authority field in the product authority database for a product listed as a potential match,
    multiply the distance by a coefficient to obtain a value,
    add the value to a running total, and
    calculate the confidence level for the potential match based on the running total.

* * * * *

UNITED STATES PATENT AND TRADEMARK OFFICE
CERTIFICATE OF CORRECTION

PATENT NO. : 7,979,459 B2
APPLICATION NO. : 11/763539
DATED : July 12, 2011
INVENTOR(S) : Kai Wu et al.

Page 1 of 1

It is certified that error appears in the above-identified patent and that said Letters Patent is hereby corrected as shown below:

In column 16, line 33, in Claim 10, delete "product in the" and insert -- in the --, therefor.

In column 17, line 48, in Claim 17, after "information" delete "that".

Signed and Sealed this
Sixteenth Day of August, 2011

David J. Kappos
*Director of the United States Patent and Trademark Office*